US011536066B2

(12) United States Patent
Moore et al.

(10) Patent No.: US 11,536,066 B2
(45) Date of Patent: Dec. 27, 2022

(54) APPLIANCE WITH AN ADJUSTABLE DOOR HINGE

(71) Applicant: Haier US Appliance Solutions, Inc., Wilmington, DE (US)

(72) Inventors: Daniel Ian Moore, Louisville, KY (US); Charles Andrew Bierbaum, Louisville, KY (US); Marcelo Torrentes, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 326 days.

(21) Appl. No.: 16/747,724

(22) Filed: Jan. 21, 2020

(65) Prior Publication Data
US 2021/0222470 A1    Jul. 22, 2021

(51) Int. Cl.
  *E05D 7/04* (2006.01)
  *A21B 3/02* (2006.01)

(52) U.S. Cl.
  CPC .............. *E05D 7/0423* (2013.01); *A21B 3/02* (2013.01); *E05D 2007/0469* (2013.01); *E05Y 2900/308* (2013.01)

(58) Field of Classification Search
  CPC . A21B 3/02; E05D 7/0423; E05D 2007/0469; E05Y 2900/308
  See application file for complete search history.

(56) References Cited

U.S. PATENT DOCUMENTS

| 1,850,616 | A | * | 3/1932 | Barnett | H02G 3/125 |
| | | | | | 33/645 |
| 3,788,759 | A | * | 1/1974 | Grunert | B23B 47/28 |
| | | | | | 33/613 |
| 3,884,441 | A | * | 5/1975 | Barry | H02G 3/123 |
| | | | | | 248/27.1 |
| 4,615,095 | A | * | 10/1986 | Bessinger | A47B 88/467 |
| | | | | | 312/333 |
| 4,873,769 | A | * | 10/1989 | Casanave | B25H 7/00 |
| | | | | | 408/72 R |
| 5,133,094 | A | * | 7/1992 | Clarke, Jr. | E03C 1/021 |
| | | | | | 248/68.1 |
| 5,713,105 | A | * | 2/1998 | Toomey | E05D 7/0423 |
| | | | | | 16/245 |
| 5,931,425 | A | * | 8/1999 | Oliva | H02G 3/125 |
| | | | | | 33/528 |
| 8,677,566 | B2 | | 3/2014 | Vanini | |
| 2006/0096720 | A1 | * | 5/2006 | Krupke | E05D 13/1261 |
| | | | | | 160/190 |

(Continued)

FOREIGN PATENT DOCUMENTS

DE   4013571 A1   10/1991
KR   20060006476 A   1/2006

*Primary Examiner* — Matthew W Ing
(74) *Attorney, Agent, or Firm* — Dority & Manning, P.A.

(57) ABSTRACT

An appliance includes a cabinet and an inner door. The inner door is configured such that an outer door panel is mountable on the inner door. An adjustable hinge rotatably couples the inner door to the cabinet. The adjustable hinge includes a movable door balance adjuster. A visual scale graphic is positioned proximate the adjustable hinge. The visual scale graphic includes a plurality of outer door panel weight indicia and a plurality of door balance adjuster position indicia. Each of the plurality of door balance adjuster position indicia corresponds to a respective one of the plurality of outer door panel weight indicia.

18 Claims, 4 Drawing Sheets

(56) References Cited

U.S. PATENT DOCUMENTS

| | | | | |
|---|---|---|---|---|
| 2015/0128927 A1* | 5/2015 | Nelson | .................... | E05D 7/043 |
| | | | | 126/194 |
| 2018/0216832 A1* | 8/2018 | White | ....................... | E05F 5/02 |
| 2019/0316778 A1* | 10/2019 | Lee | ........................ | F24C 15/08 |

* cited by examiner

APPLIANCE WITH AN ADJUSTABLE DOOR HINGE

FIELD OF THE INVENTION

The present subject matter relates generally to oven appliances with adjustable door hinges.

BACKGROUND OF THE INVENTION

Certain appliances are designed to integrate with surrounding cabinetry. For instance, outer door panels that match surrounding cabinetry may be mounted on the appliances so that the appliances' doors match the surrounding cabinetry. This integrated appearance is highly desirable but poses challenges for appliance manufacturer and installers.

Cabinetry materials vary widely. For example, some cabinets are constructed of a relatively high-density wood, such as hickory or maple, and other cabinets are constructed of a relatively low-density wood, such as pine or fir. Many cabinets are also constructed of a substrate that is covered by veneer, and the density and thickness of the substrate material can vary widely. Due to material variations, a weight of the outer door panels attached to the appliances also varies. Appliance manufacturers and installers should account for the outer door panel weight variations to provide a well fit appliance. However, adjusting an appliance for a weight of an outer door panel can be difficult and tedious.

BRIEF DESCRIPTION OF THE INVENTION

Aspects and advantages of the invention will be set forth in part in the following description, or may be apparent from the description, or may be learned through practice of the invention.

In an example embodiment, an appliance includes a cabinet and an inner door. The inner door is configured such that an outer door panel is mountable on the inner door. An adjustable hinge rotatably couples the inner door to the cabinet. The adjustable hinge includes a movable door balance adjuster. A visual scale graphic is positioned proximate the adjustable hinge. The visual scale graphic includes a plurality of outer door panel weight indicia and a plurality of door balance adjuster position indicia. Each of the plurality of door balance adjuster position indicia corresponds to a respective one of the plurality of outer door panel weight indicia.

In an example aspect, the adjustable hinge includes a spring and the movable door balance adjuster includes a nut. The nut is rotatable to adjust compression of the spring and a balance of the door on the adjustable hinge.

In an example aspect, the plurality of door balance adjuster position indicia includes a plurality of nut position indicia. Each of the plurality of nut position indicia corresponds to a respective one of the plurality of outer door panel weight indicia.

In an example aspect, the inner door includes a front panel and an access panel. The front panel defines an opening at an edge of the front panel. The access panel is removably mounted to the front panel at the opening. The visual scale graphic is positioned on the front panel adjacent the opening.

In an example aspect, the inner door includes a front panel and an access panel. The front panel defines an opening at an edge of the front panel. The access panel is rotatably mounted to the front panel at the opening. The visual scale graphic is positioned on the access panel.

In an example aspect, the plurality of outer door panel weight indicia includes no less than five outer door panel weight indicia and no more than thirty outer door panel weight indicia.

In an example aspect, the plurality of outer door panel weight indicia includes about fifteen outer door panel weight indicia.

In an example aspect, the plurality of outer door panel weight indicia are spaced apart along a vertical direction in the visual scale graphic.

In an example aspect, the inner door includes a front surface and a rear surface. The rear surface of the inner door faces the cabinet when the inner door is closed. The front surface of the inner door facing away from the cabinet when the inner door is closed. The visual scale graphic is positioned at the front surface of the inner door.

In an example aspect, the appliance may be an oven appliance.

Each of the example aspects recited above may be combined with one or more of the other example aspects recited above in certain embodiments. For instance, all of the nine example aspects recited above may be combined with one another in some embodiments. As another example, any combination of two, three, four, five, or more of the nine example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
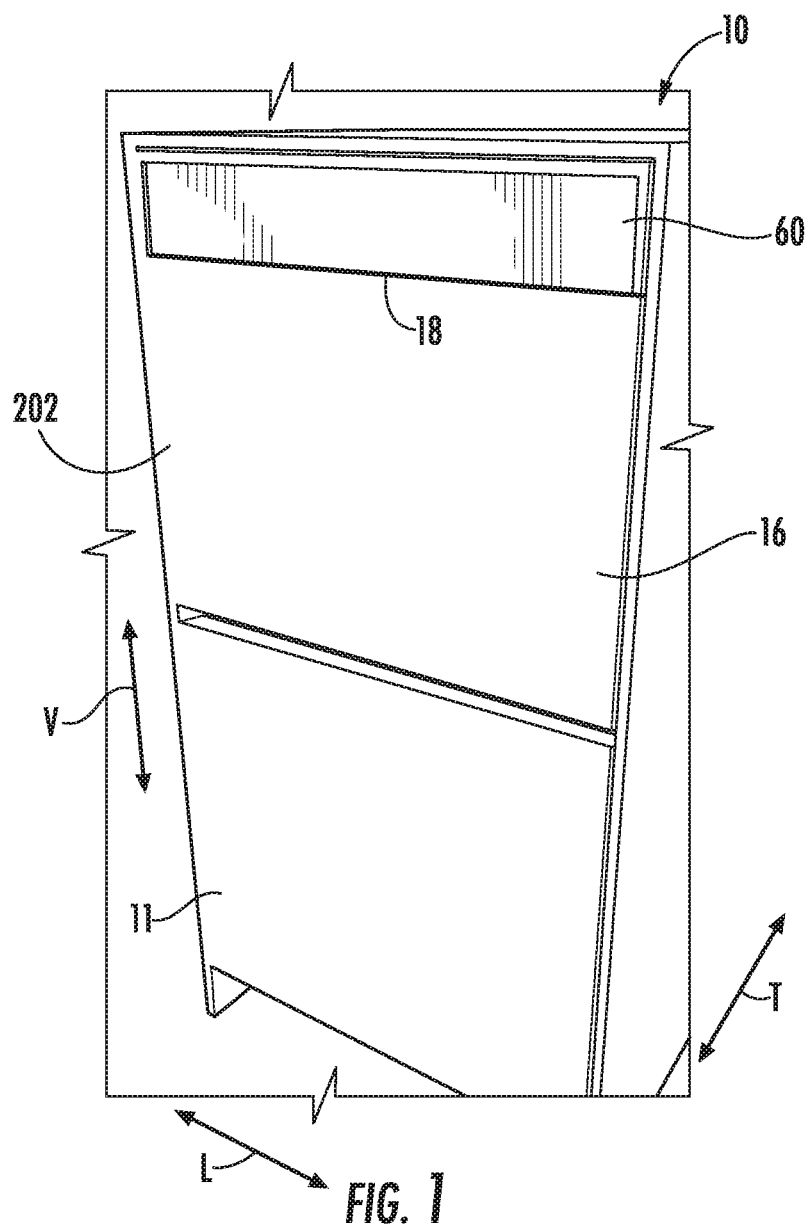
FIG. 1 is a perspective view of an oven appliance according to an example embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Example aspects of the present disclosure provide an appliance with adjustable hinges and features to assist with accurate adjustment of the adjustable hinges by a user. The adjustable hinges support a door on a cabinet, and the adjustable hinges may be adjusted to account for the different weights of various outer door panels that may be mounted to the door. While described in greater detail below in the context of an oven appliance, it will be understood that the present disclosure may be used in or with any other suitable appliance, such as a dishwasher appliance, a refrigerator appliance, an oven range appliance, a trash compactor appliance, etc., in alternative example embodiments.

Figure 2:
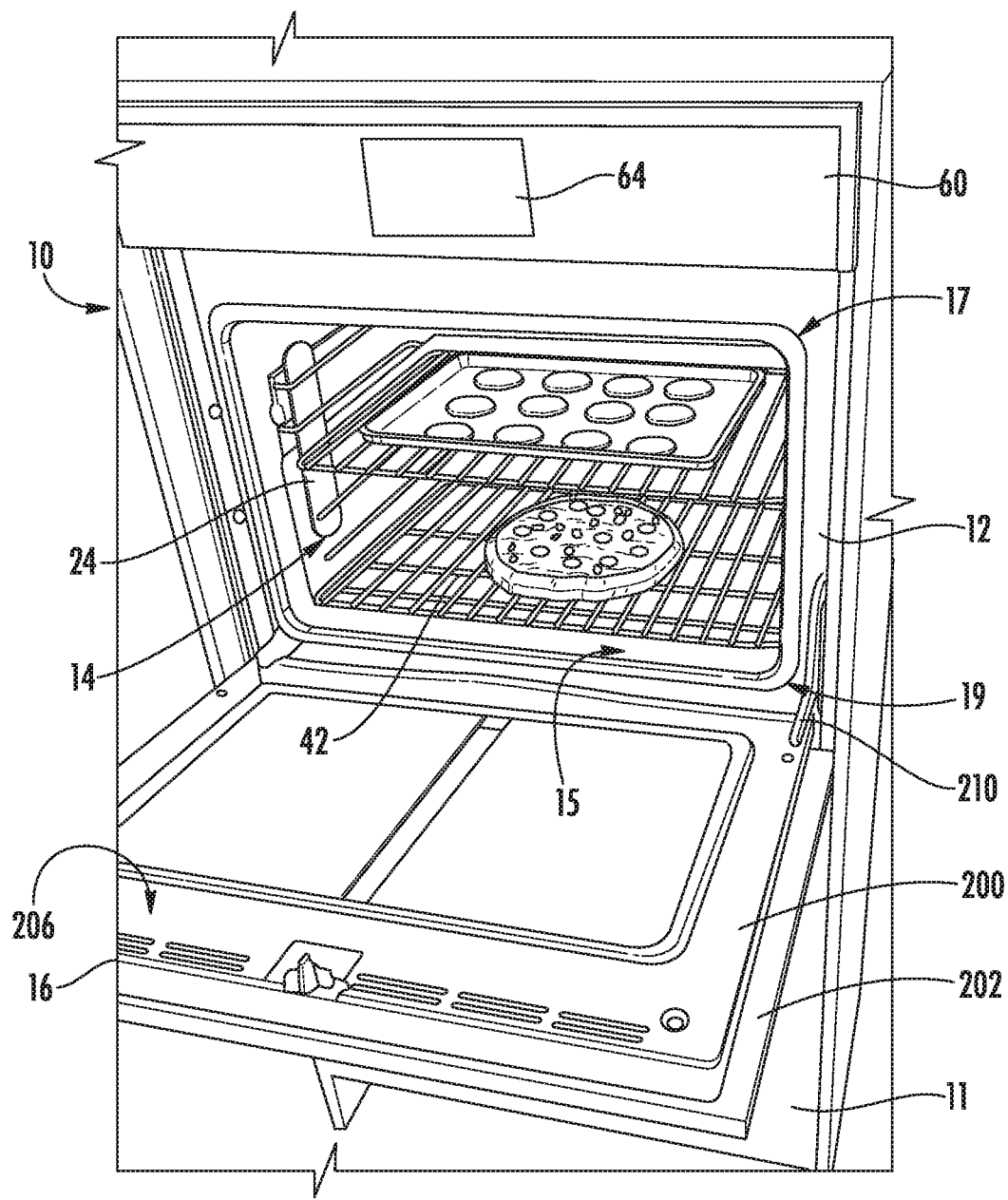
FIG. 2 is another perspective view of the example oven appliance of FIG. 1 with a door shown in an open position.

FIGS. 1 and 2 depict an example oven appliance 10 that may be configured in accordance with aspects of the present disclosure. For the particular embodiment of FIGS. 1 and 2, oven appliance 10 defines a vertical direction V, a lateral direction L and a transverse direction T. The vertical, lateral and transverse directions are mutually perpendicular and form an orthogonal direction system. As noted above, oven appliance 10 is provided by way of example only, and the present disclosure may be used in any suitable oven appliance, such as a double oven range, a single wall oven, a double wall oven, etc. Thus, it should be appreciated that the invention is not limited to any particular style, model, or configuration of oven appliance 10. As shown in FIG. 1, oven appliance 10 may include features for integrating with adjacent cabinetry 11. Thus, an outer appearance of oven appliance 10 may be selected to match adjacent cabinetry 11.

Oven appliance 10 includes an insulated cabinet 12 with an interior cooking chamber 14 defined by an interior surface 15 of cabinet 12. Cooking chamber 14 extends between a top portion 17 and a bottom portion 19 along the vertical direction V. Cooking chamber 14 is configured for the receipt of one or more food items to be cooked. A door assembly 16 is rotatably mounted to cabinet 12, e.g., with a pair of adjustable hinges 210, and a handle 18 is mounted to door assembly 16 to assist a user with opening and closing door assembly 16 while accessing cooking chamber 14. For example, a user can pull on handle 18 to open or close door assembly 16 and access cooking chamber 14.

Oven appliance 10 can include a seal (not shown) between door assembly 16 and cabinet 12 that assists with maintaining heat and cooking fumes within cooking chamber 14 when door assembly 16 is closed as shown in FIG. 1. A baking rack 24 is positioned in cooking chamber 14 for the receipt of food items or utensils containing food items. Baking rack 24 may be slidably received onto embossed ribs or sliding rails such that rack 24 may be conveniently moved into and out of cooking chamber 14 when door assembly 16 is open.

A lower heating assembly, e.g., bake heating assembly 42, may be included in oven appliance 10, and may include one or more heating elements. Bake heating element 42 may be disposed within the cooking chamber 14, such as at bottom portion 19 of cooking chamber 14. In exemplary embodiments as illustrated, the bake heating element 42 is an electric heating element, as is generally understood. Alternatively, the bake heating element 42 may be a gas burner or other suitable heating element having other suitable heating sources. Bake heating element 42 may generally be used to heat cooking chamber 14 for both cooking and cleaning of oven appliance 10. Additionally, an upper heating assembly, e.g., broil heating assembly, (not shown) may be included in oven appliance 10, such as at top portion 17 of cooking chamber 14. Broil heating element may additionally generally be used to heat cooking chamber 14 for both cooking and cleaning of oven appliance 10.

Oven appliance 10 may also include a user interface panel 60. User interface panel 60 include a plurality of controls through which a user may select various operational features and modes and monitor progress of oven appliance 10. In one embodiment, user interface 60 may represent a general purpose I/O ("GPIO") device or functional block. In one embodiment, user interface 60 may include input components, such as one or more of a variety of electrical, mechanical or electro-mechanical input devices including rotary dials, push buttons, and touch pads. User interface 60 may include a display component, such as a digital or analog display device 64 designed to provide operational feedback to a user.

As shown in FIG. 2, door assembly 16 may include an inner door 200 and an outer door panel 202. Inner door 200 may be rotatably mounted to cabinet 12 with a pair of adjustable hinges 210. Inner door 200 may be insulated and may assist with sealing cooking chamber 14 when door assembly 16 is closed. For example, inner door 200 may have a front surface 204 and a rear surface 206. Front and rear surfaces 204, 206 may be positioned opposite each other on inner door 200. Thus, e.g., rear surface 206 may face cooking chamber 14 when door assembly 16 is closed. Conversely, front surface 204 may face away from cooking chamber 14 when door assembly 16 is closed.

Inner door 200 may be constructed of or with a heat tolerant material, such as a sheet metal. In particular, rear surface 206 of inner door 200 may be formed from a sheet of enameled steel. Thus, inner door 200 may assist with maintaining heat and cooking fumes within cooking chamber 14 when door assembly 16 is closed.

Outer door panel 202 may be mounted on inner door 200. Thus, e.g., outer door panel 202 may rotate with inner door 200 on adjustable hinges 200. Outer door panel 202 may be decorative and selected to match adjacent cabinetry 11. As an example, outer door panel 202 may be constructed of wood or another suitable material that matches or is similar to the material of adjacent cabinetry 11.

Figure 3:
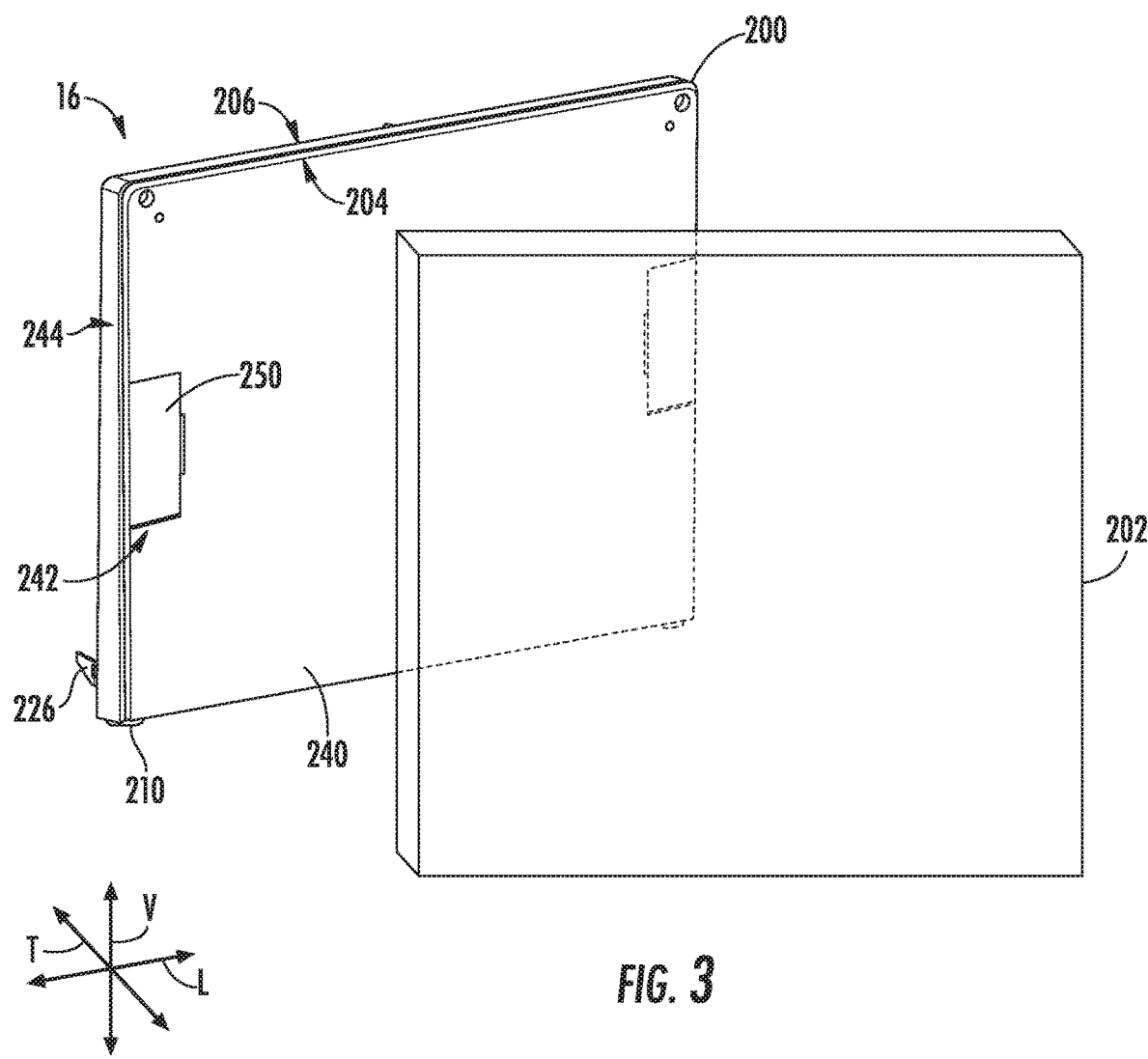
FIG. 3 is a partially exploded view of the door of the example oven appliance of FIG. 1.
Figure 4:
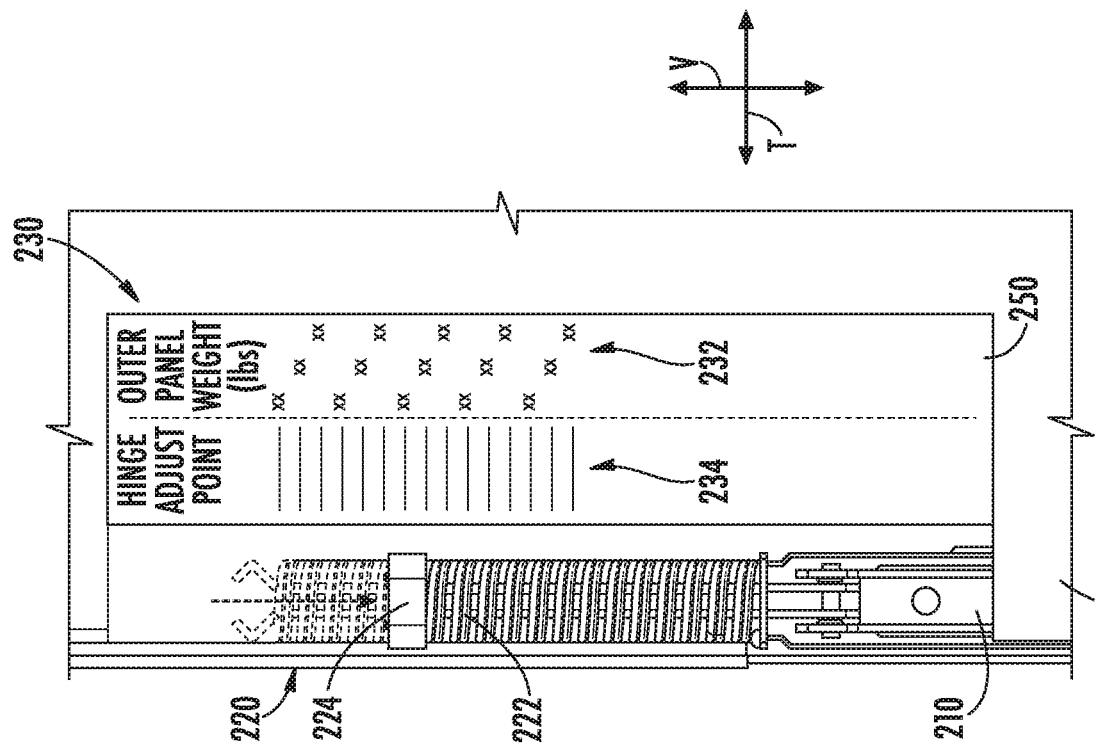
FIGS. 4 and 5 are elevation views of an adjustable hinge of the example over appliance of FIG. 1.
Figure 5:
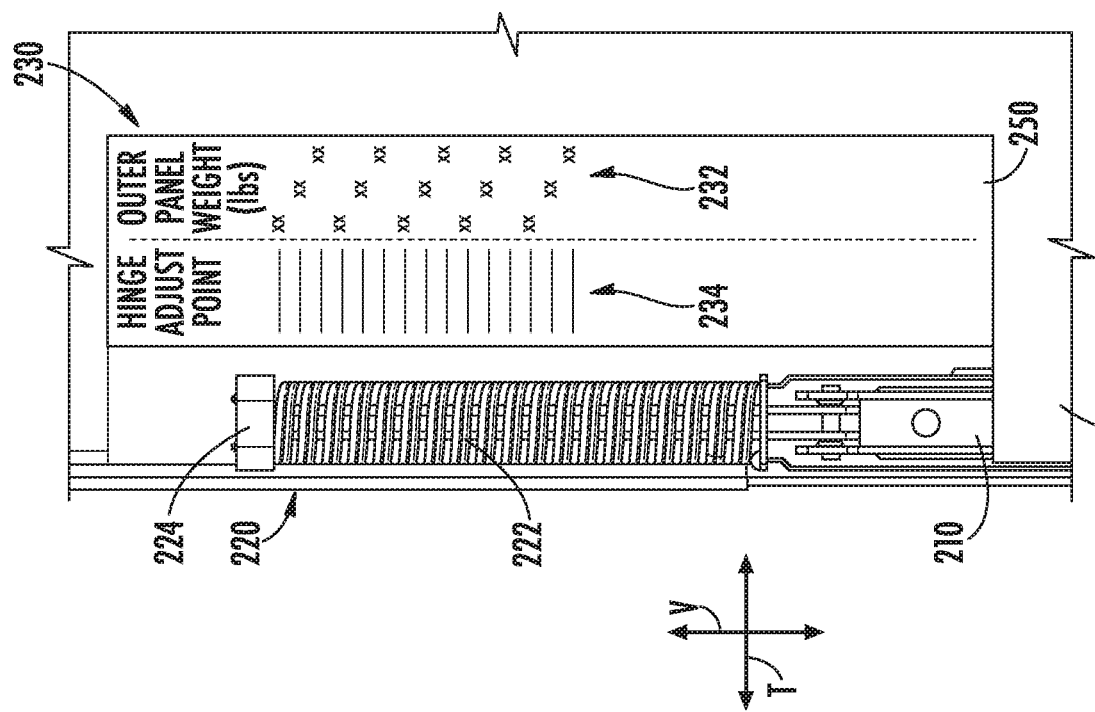

As noted above, adjustable hinges 210 rotatably couple inner door 200 to cabinet 12. Adjustable hinges 210 may include a movable door balance adjuster 220 (FIGS. 4 and 5). Door balance adjuster 220 may adjust a balance of door assembly 16 on adjustable hinges 210. For example, door balance adjuster 220 may be adjusted to increase or decrease a force applied onto a hinge arm 226 (FIG. 3) of adjustable hinge 210 and thereby balance the force required for a user to open and/or close door assembly 16. Due to the variety of outer door panels 202 which may be mounted to inner door 200, door balance adjuster 220 allow heavy and light outer door panels 202 to be mounted on inner door 200 in a balanced manner.

Door balance adjuster 220 may include various devices for adjusting the balance of door assembly 16. For instance, door balance adjuster 220 may include a screw-type adjustment, a friction component adjustment, etc. As an example, door balance adjuster 220 may include a spring 222 and a nut 224. Nut 224 may be rotatable to adjust a compression of spring 222. By increasing the compression of spring 222 with nut 224, a force applied by spring 222 onto hinge arm 226 of adjustable hinge 210 may increase. Conversely, the force applied by spring 222 onto hinge arm 226 of adjustable hinge 210 may decrease by decreasing the compression of spring 222 with nut 224. A user may rotate nut 224 to increase the compression of spring 222 when a relatively heavy outer door panel 202 is mounted on inner door 200. Conversely, the user may rotate nut 224 to decrease the compression of spring 222 when a relatively light outer door panel 202 is mounted on inner door 200. In such a manner, nut 224 may be rotated to adjust the balance of door assembly 16 on adjustable hinges 210.

Oven appliance 10 also includes features for facilitating adjustment of door balance adjuster 220. In particular, oven appliance 10 includes a visual scale graphic 230. A respective visual scale graphic 230 may be positioned proximate a respective one of adjustable hinges 210. Visual scale graphic 230 may include a plurality of outer door panel weight indicia 232 and a plurality of door balance adjuster position indicia 234. Door balance adjuster position indicia 234 may be a plurality of nut position indicia, as described in greater detail below. Visual scale graphic 230 may correspond to a scaled correlation between a weight of outer door panel 202 and a required position for door balance adjuster 220 to balance door assembly 16 based on the weight of outer door panel 202. Thus, visual scale graphic 230 may advantageously assist a technician or other party with adjusting adjustable hinges 210 in an accurate manner to account for the weight of outer door panel 202 without requiring time consuming and tedious multi-step iterative tuning of adjustable hinges 210 and thus streamline installation of outer door panel 202 on inner door 200.

Each of door balance adjuster position indicia 234 may correspond to a respective one of outer door panel weight indicia 232. As an example, each door balance adjuster position indicia 234 may correspond to a hash or marking on the visual scale graphic 230, and each outer door panel weight indicia 232 may correspond to a respective weight value of for outer door panel 202 on the visual scale graphic 230. Outer door panel weight indicia 232 and/or door balance adjuster position indicia 234 may be vertically spaced apart in visual scale graphic 230. A technician or other party may move door balance adjuster 220 to or adjacent a corresponding one of door balance adjuster position indicia 234 depending upon the weight of outer door panel 202 added to inner door 200.

Visual scale graphic 230 may include a suitable number of indicia, e.g., outer door panel weight indicia 232 and/or door balance adjuster position indicia 234. For instance, outer door panel weight indicia 232 may include no less than five (5) outer door panel weight indicia 232 and no more than thirty (30) outer door panel weight indicia 232. In certain example, embodiments, outer door panel weight indicia 232 may include about fifteen (15) outer door panel weight indicia 232. As used herein, the term "about" means within five indicia of the stated number of indicia when used in the context of indicia. Door balance adjuster position indicia 234 may include the same number of indicia recited above for outer door panel weight indicia 232. As may be seen from the above, visual scale graphic 230 may advantageously include numerous indicia, e.g., to allow for a wide range of outer door panels 202 with various weights.

Visual scale graphic 230 may be formed, printed, adhered, etc. to a suitable component of inner door 200. For instance, visual scale graphic 230 may be positioned at front surface 204 of inner door 200 in certain example embodiments. As another example, inner door 200 may include a front panel 240 and an access panel 250. Outer door panel 202 may be mounted to inner door 200 at front panel 240. Front panel 240 may define an opening 242, e.g., at or adjacent an edge 244 of front panel 240. Access panel 250 may be removably mounted (e.g., with mounting tabs and/or fasteners) to front panel 240 at opening 244, and visual scale graphic 230 may be positioned on front panel 240 adjacent opening 244. As another example, access panel 250 may be rotatably mounted to front panel 240 at opening 240, e.g., with a suitable hinge, and visual scale graphic 230 may be positioned on access panel 250, e.g., an inner surface of access panel 250 that faces an interior of inner door 200 when access panel 250 is closed. In alternative example embodiments, access panel 250 may be position on a side or rear of inner door 200. As yet another example, access panel 250 may be slidably mounted to front panel 240 at opening 240, and visual scale graphic 230 may be positioned on access panel 250, e.g., an outer surface of access panel 250 that faces away from the interior of inner door 200.

Adjustable hinge 210 may be positioned within inner door 200 at opening 244. Thus, access panel 250 may selectively cover adjustable hinge 210 at opening 244. A technician or other party may remove and/or open access panel 250 to view adjustable hinge 210. For instance, door balance adjuster 220, e.g., nut 224, may be positioned within inner door 200 at opening 244, and the technician or other party may remove and/or open access panel 250 to view door balance adjuster 220. During adjustment of door balance adjuster 220, the technician or other party may utilize visual scale graphic 230 to match the position of door balance adjuster 220 (e.g., an edge of nut 224) with the one of outer door panel weight indicia 232 that corresponds the weight of outer door panel 202 that will be mounted on inner door 200.

As may be seen from the above, the present disclosure assists a user or installer of oven appliance 10 with easily adjusting hinges 210 to account for a variety of weights for door assembly 16. Access panels 250 may be easily opened or removed for the user to gain access to door balance adjuster 220, and visual scale graphic 230 gives the user or installer a reference for adjustment. In particular, visual scale graphic 230 may provide a scaled correlation between the weight of outer door panel 202 (which varies depending upon adjacent cabinetry 11) and the necessary adjustment of door balance adjuster 220. This allows the user or installer to adjust hinges 210 accurately and reduces/eliminates the need for iterative tuning of door balance adjuster 220. Access panels 250 may then be closed, and outer door panel 202 mounted on inner door 200, e.g., one time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
a cabinet;
an inner door, the inner door configured such that an outer door panel is mountable on the inner door;
an adjustable hinge rotatably coupling the inner door to the cabinet, the adjustable hinge comprising a spring and a nut, the nut rotatable to adjust compression of the spring and a balance of the inner door on the adjustable hinge; and
a visual scale graphic positioned proximate the adjustable hinge, the visual scale graphic comprising a plurality of outer door panel weight indicia and a plurality of nut position indicia, each of the plurality of nut position indicia corresponding to a respective one of the plurality of outer door panel weight indicia.

2. The appliance of claim 1, wherein the inner door comprises a front panel and an access panel, the front panel defining an opening at an edge of the front panel, the access panel removably mounted to the front panel at the opening, the visual scale graphic positioned on the front panel adjacent the opening.

3. The appliance of claim 1, wherein the inner door comprises a front panel and an access panel, the front panel defining an opening at an edge of the front panel, the access panel rotatably mounted to the front panel at the opening, the visual scale graphic positioned on the access panel.

4. The appliance of claim 1, wherein the plurality of outer door panel weight indicia comprises no less than five outer door panel weight indicia and no more than thirty outer door panel weight indicia.

5. The appliance of claim 4, wherein the plurality of outer door panel weight indicia comprises about fifteen outer door panel weight indicia.

6. The appliance of claim 1, wherein the plurality of outer door panel weight indicia are spaced apart along a vertical direction in the visual scale graphic.

7. The appliance of claim 1, wherein the inner door comprises a front surface and a rear surface, the rear surface of the inner door facing the cabinet when the inner door is closed, the front surface of the inner door facing away from the cabinet when the inner door is closed, the visual scale graphic positioned at the front surface of the inner door.

8. The appliance of claim 1, wherein the inner door comprises a front panel and an access panel, the front panel defining an opening at an edge of the front panel, the access panel positioned on the front panel at the opening, the plurality of outer door panel weight indicia is positioned on one or both of the front panel and the access panel.

9. An oven appliance, comprising:
a cabinet defining a cooking chamber;
an inner door, the inner door configured such that an outer door panel is mountable on the inner door;
an adjustable hinge rotatably coupling the inner door to the cabinet such that the inner door is rotatable relative to the cabinet, the adjustable hinge comprising a spring and a nut, the nut rotatable to adjust compression of the spring and a balance of the inner door on the adjustable hinge; and
a visual scale graphic positioned proximate the adjustable hinge, the visual scale graphic comprising a plurality of outer door panel weight indicia and a plurality of nut position indicia, each of the plurality of nut position indicia corresponding to a respective one of the plurality of outer door panel weight indicia.

10. An appliance, comprising:
a cabinet;
an inner door, the inner door configured such that an outer door panel is mountable on the inner door;
an adjustable hinge rotatably coupling the inner door to the cabinet, the adjustable hinge comprising a movable door balance adjuster; and
a visual scale graphic positioned proximate the adjustable hinge, the visual scale graphic comprising a plurality of outer door panel weight indicia and a plurality of door balance adjuster position indicia, each of the plurality of door balance adjuster position indicia corresponding to a respective one of the plurality of outer door panel weight indicia.

11. The appliance of claim 10, wherein the adjustable hinge comprises a spring and the movable door balance adjuster comprises a nut, the nut rotatable to adjust compression of the spring and a balance of the inner door on the adjustable hinge.

12. The appliance of claim 10, wherein the inner door comprises a front panel and an access panel, the front panel defining an opening at an edge of the front panel, the access panel removably mounted to the front panel at the opening, the visual scale graphic positioned on the front panel adjacent the opening.

13. The appliance of claim 10, wherein the inner door comprises a front panel and an access panel, the front panel defining an opening at an edge of the front panel, the access panel rotatably mounted to the front panel at the opening, the visual scale graphic positioned on the access panel.

14. The appliance of claim 10, wherein the plurality of outer door panel weight indicia comprises no less than five outer door panel weight indicia and no more than thirty outer door panel weight indicia.

15. The appliance of claim 14, wherein the plurality of outer door panel weight indicia comprises about fifteen outer door panel weight indicia.

16. The appliance of claim 10, wherein the plurality of outer door panel weight indicia are spaced apart along a vertical direction in the visual scale graphic.

17. The appliance of claim 10, wherein the inner door comprises a front surface and a rear surface, the rear surface of the inner door facing the cabinet when the inner door is closed, the front surface of the inner door facing away from the cabinet when the inner door is closed, the visual scale graphic positioned at the front surface of the inner door.

18. The appliance of claim 10, wherein the inner door comprises a front panel and an access panel, the front panel defining an opening at an edge of the front panel, the access panel positioned on the front panel at the opening, the plurality of outer door panel weight indicia is positioned on one or both of the front panel and the access panel.

* * * * *